United States Patent [19]

Thoese

[11] Patent Number: 4,824,725

[45] Date of Patent: Apr. 25, 1989

[54] DRAFTING MATERIAL

[75] Inventor: Klaus Thoese, Wiesbaden, Fed. Rep. of Germany

[73] Assignee: Hoechst Aktiengesellschaft, Frankfurt am Main, Fed. Rep. of Germany

[21] Appl. No.: 133,485

[22] Filed: Dec. 15, 1987

[30] Foreign Application Priority Data

Dec. 16, 1986 [DE] Fed. Rep. of Germany ....... 3642847

[51] Int. Cl.[4] .............................................. B32B 27/08

[52] U.S. Cl. .................................... 428/336; 428/195; 428/480; 428/482; 428/483; 428/520; 428/522; 428/524; 428/910; 430/157; 430/158

[58] Field of Search ............... 428/482, 483, 195, 220, 428/522, 524, 910; 430/157, 158, 336, 520

[56] References Cited

U.S. PATENT DOCUMENTS

| | | | |
|---|---|---|---|
| 3,396,046 | 8/1968 | Landau | 106/287 |
| 3,563,942 | 2/1971 | Heiberger | 260/29.2 |
| 3,720,539 | 3/1973 | Seibel et al. | 117/138.8 F |
| 3,734,874 | 5/1973 | Kibler et al. | 260/29.2 E |
| 4,139,506 | 2/1979 | Thoese et al. | 260/16 |
| 4,252,885 | 2/1981 | McGrail et al. | 430/160 |
| 4,500,598 | 2/1985 | Thoese | 428/331 |
| 4,542,059 | 9/1985 | Toganoh et al. | 428/141 |
| 4,543,316 | 9/1985 | Thoese | 430/162 |
| 4,575,465 | 3/1986 | Viola | 427/261 |

FOREIGN PATENT DOCUMENTS

| | | |
|---|---|---|
| 0087688 | 9/1983 | European Pat. Off. . |
| 0125113 | 11/1984 | European Pat. Off. . |
| 58-078761 | 6/1958 | Japan . |
| 59-222381 | 12/1984 | Japan . |
| 60-046289 | 3/1985 | Japan . |
| 1127076 | 9/1968 | United Kingdom . |

*Primary Examiner*—Ellis P. Robinson
*Assistant Examiner*—P. R. Schwartz
*Attorney, Agent, or Firm*—Foley & Lardner, Schwartz, Jeffery, Schwaab, Mack, Blumenthal & Evans

[57] ABSTRACT

Disclosed is a drafting material comprising a transparent base material with a hydrophilic coating which readily accepts ink, ensures rapid drying of the ink and can be marked in a wipe-resistant manner. The hydrophilic coating of the drafting material includes sulfonate group-containing copolyesters which are preferably present in an amount of 30 to 70 percent by weight. The drafting material can be marked with felt-tip pens containing aqueous inks.

11 Claims, No Drawings

DRAFTING MATERIAL

BACKGROUND OF THE INVENTION

The present invention relates to a drafting material comprising a transparent base material which on one or both surfaces is provided with a hydrophilic coating containing polyvinyl alcohol and conventional additives.

Published European patent application No. 0,125,113 discloses hydrophobic layer supports having layers that enable them to absorb inks. The coatings employed for this purpose comprise mixtures of polyvinyl pyrrolidone and a compatible component, for example, polyvinyl alcohol.

Published German Application No. 33 30 420 discloses a recording material which comprises a coated substrate where the coating includes particles of a filler in a hydrophilic binder, such as polyvinyl alcohol.

Coated, transparent supports suitable for ink jet imaging processes are also known from U.S. Pat. No. 4,575,465. The coatings employed in accordance with this publication comprise mixtures of polyvinyl alcohol and vinylpyridine/vinylbenzyl copolymers in the form of their quaternary salts.

Finally, a process for the preparation of corresponding drafting materials is described in Published Japanese Application No. 59/222,381, where the transparent base is coated with a double layer containing polyvinyl alcohol.

It is also known to use mixtures of polyester and polyvinyl alcohol as overcoats for ink jet materials; see Japanese Published Application No. 60/046,289.

The known materials are suitable for aqueous inks employed to produce ink jet prints. However, it has been found that they are not suited for aqueous inks of the types employed for felt-tip pens of the type used in imaging or plotting apparatuses.

The known materials either do not accept the ink or the ink does not sufficiently adhere to the surface of the material, i.e., it is not wipe-resistant. In many instances, the layers are highly water-soluble, so that finger prints which can no longer be removed are left on the material during handling.

SUMMARY OF THE INVENTION

It is therefore an object of the present invention to provide an improved drafting material.

It is a particular object of the invention to provide a drafting material suitable for use in plotters, having a surface coating that is hydrophilic enough to ensure that inks of pen plotters or similar devices are readily accepted and that drying of the inks proceeds rapidly and in a wipe-resistant manner.

Yet another object of the instant invention resides in providing a material having a surface coating which is sufficiently insoluble in water to prevent the formation of permanent fingerprints on the coating.

In accomplishing the foregoing objects, there has been provided according to the present invention a drafting material, comprising a transparent base material having on at least one surface a hydrophilic coating containing polyvinyl alcohol and a sulfonate group-containing copolyester.

Further objects, features and advantages of the invention will become apparent from the detailed description of preferred embodiments that follows.

DETAILED DESCRIPTION OF PREFERRED EMBODIMENTS

In the drafting material according to the invention, the hydrophilic coating preferably comprises from about 30 to 70 percent by weight of polyvinyl alcohol and from about 30 to 70 percent by weight of a sulfonate group-containing polyester, in each case related to the total weight of the substances mentioned. A weight ratio of 1:1 is particularly preferred.

In this way, a drafting material is made available having a transparent base material provided with a transparent, scratch-resistant, optionally antistatic coating. This coating is well-suited for being marked with felt-tip pens using aqueous inks, and ink is absorbed rapidly and in a wipe-resistant manner by the coating.

The base materials employed are polyester films which are known for their good mechanical, thermal and optical properties and which are chemically inert. These films are, for example, ideal base materials for heatresistant overhead films and other applications where clear films are required as base materials. Preference is thereby given to base materials comprised of biaxially stretched and heat-set polyethylene terephthalate films.

As a rule, the polyester base film is coated with an adhesive layer. Adhesive layers which may be employed are, for example, known from the following patents: German Pat. No. 16 94 534 (equivalent to U.S. Pat. No. 3,720,539); German Pat. No. 12 28 414 (equivalent to U.S. Pat. No. 3,396,046); German Pat. No. 16 29 480 (equivalent to British Pat. No. 1,127,076); and German Pat. No. 25 55 783 (equivalent to U.S. Pat. No. 4,139,506). The disclosures of these patents are incorporated by reference.

The polyester film is provided with an adhesive layer and then coated with an aqueous solution of the components according to this invention, i.e., a combination of polyvinyl alcohol and a sulfonate group-containing copolyester. It is also possible to disperse the latter in water.

The copolyesters which can be used for the purposes of this invention are known per se and are, for example, described in German Auslegeschift No. 18 16 163 (equivalent to U.S. Pat. No. 3,734,874), in German Pat. No. 28 13 014 (equivalent to U.S. Pat. No. 4,252,885) and in U.S. Pat. No. 3,563,942, the disclosures of which are hereby incorporated by reference. They essentially comprise water-soluble or water-dispersible polyesters which are obtained by reacting aliphatic, cycloaliphatic or aromatic dicarboxylic acids with aliphatic, cycloaliphatic or aromatic diols, whereby the esterifiable dicarboxylic acids or diols contain a radical of the formula—$SO_3M$ which is bonded to an aromatic ring and where M denotes a hydrogen ion or a metal ion. They are especially intended for sizing agents, glues, hot-melt adhesives, sheetings and thin films.

It was not foreseeable that it would be possible to process these copolyesters, in combination with polyvinyl alcohols, into coatings which excellently accept aqueous inks, for the copolyesters themselves result in surfaces to which inks adhere quite badly.

The polyvinyl alcohols used in accordance with this invention comprise readily water-soluble types. They include in particular those having a content of residual acetyl groups of less than about 50 mole percent, preferably of less than about 25 mole percent.

The applied hydrophilic coating in general has a thickness of about 0.5 to 10 μm. The preferred thickness ranges vary according to their intended use. For example, a thickness range from about 2 to 4 μm is employed for drafting materials, whereas in combination with photosensitive materials, thicknesses between about 5 and 10 μm are preferred.

The hydrophilic coating for the drafting material in accordance with this invention preferably contains crosslinking agents. Suitable crosslinking agents preferably are commercially available, partially or completely etherified formaldehyde compounds derived from urea or melamine. It is, however, also possible to employ polyanhydrides or titanium-containing and/or zirconium-containing compounds, which are capable of crosslinking polyvinyl alcohols. If the content of crosslinking agent is too high it might take too long for the ink to dry. Therefore, the amount of crosslinking agent contained in the dried coating in general should not exceed about 5 percent by weight. Preferably, the hydrophilic coating contains from about 0.5 to 3 percent by weight, relative to the weight of the dry coating, if a formaldehyde compound derived from urea or melamine is used as the crosslinking agent. If a zirconium-containing or titanium-containing compound or a polyanhydride is used as the crosslinking agent, its content may even exceed 5 percent by weight.

If crosslinking agents based on formaldehyde are used, an acid must be present. Examples of suitable acids include citric acid and p-toluenesulfonic acid.

Further additives which may be contained in the hydrophilic coating include slip agents. In accordance with this invention only fine-particulate, insoluble substances are suited for this purpose, in order not to impair the projection properties of overhead films.

The hydrophilic coating may also contain ionic or non-ionic surfactants, antistatic agents and other auxiliaries, for example, dyes, in order to achieve special effects.

Substances derived from amino acids have been found to be both effective surfactants and also antistatic agents. It is, however, also possible to employ other suitable antistatic agents and/or surfactants, as long as they are compatible with the other constituents of the aqueous hydrophilic coating composition.

The drafting materials provided with the hydrophilic layer of this invention can also be sensitized, for example, by means of aqueous solutions of photosensitive substances. Examples of suitable applications are single-component or two-component diazo copying materials.

Therefore, the drafting material further comprises, in a single component version, a photosensitive diazonium compound in the hydrophilic coating, in combination with a stabilizer. A two-component diazo copying material further comprises a coupling component in the hydrophilic coating.

The invention will now be explained in greater detail by way of the following Examples. The following chemicals are employed in the Examples:

| | Sulfonate group-containing copolyester: | | | |
|---|---|---|---|---|
| Name | Tg °C. | Molecular weight | Hydroxyl number | Acid number |
| AQ 29+ | 29 | 14,000 | 6.0 | 2 |
| AQ 38+ | 38 | 18,000 | 5.0 | 2 |
| AQ 55+ | 55 | 18,000 | 5.3 | 2 |

+Polymers available from EASTMAN KODAK
The AQ polymers are available as dispersions (D-types) or in solid form (S-types)

| | Polyvinyl alcohols: | | |
|---|---|---|---|
| Name (type) | Viscosity of a 4% strength solution at 20° C. (mPas) | Degree of hydrolysis (Mole percent) | Residual acetyl content (Weight percent) |
| I | 18 | ca. 88 | ca. 11 |
| II | 10 | ca. 74 | ca. 21 |
| III | 4 | ca. 88 | ca. 11 |
| IV | 4 | ca. 98 | ca. 2 |
| V | 10 | ca. 98 | ca. 2 |
| VI | 66 | ca. 99.7 | ca. 0.4 |

Ethylene oxide adduct FIXEGAL ® N, available from CHEMISCHE FABRIK GRUENAU:

In this product, the effective substance, which is an ethylene oxide adduct based on an amine, is dissolved in a solvent. The concentration is about 58 percent by weight. The product as supplied has a density of 1.042 and a pH of 7.0 to 7.5.

Products having a comparable effect are solid ethylene oxide adducts of fatty alcohols or substituted phenols.

Partially etherified melamine/formaldehyde resin MW, (MADURIT ® MW 815 from CASSELLA). It is available as a 75% solution in water, having a viscosity of 300 to 500 mPas and a pH of 8±0.5.

Etherified melamine/formaldehyde resin MF (MAPRENAL ® MF 900 from HOECHST AG). Concentration 96%; can be diluted with water; pH 9.0–10. Density of product as supplied is about 1.2; iodine dye number, acc. to DIN 6,162, is 6.5.

EXAMPLE 1

Biaxially stretched and heat-set sheets of polyethylene terephthalate film having a thickness of 125 μm were used as the transparent base material. One surface of the film sheets was provided with a polyvinylidene-chloride-containing, adhesion-promoting layer as described in German Pat. No. 25 55 783 (equivalent to U.S. Pat. No. 4,139,506).

The surfaces, to which the adhesion promoter had been applied, were coated with several different compositions which were present in the form of 10% solutions in deionized water. The solutions comprised a sulfonate group-containing copolyester (AQ polymer 29 S from EASTMAN KODAK) and polyvinyl alcohol (Type I, as described above) in varying weight ratios. The solutions were applied by means of a doctor blade and dried in a circulating air cabinet at 120° C. for about 1 minute. The resulting coatings had a thickness of about 2 μm.

The following tests were performed:

(A) Adhesion of the coating to the base material

The coating to be tested was scratched by means of a criss-cross cut in accordance with DIN 53,151. A strip of adhesive tape (TESABAND ® 104 colorless, available from BEIERSDORF) was pressed onto the scratched surface area with the aid of the handle of a pair of scissors and pulled off with a jerk.

(B) Water resistance of the hydrophilic coating

A drop of water was wiped over the film with a finger, and the changes of the coating in the wet state and after drying at room temperature were observed.

(C) Drying of the ink

Using plotter pens filled with aqueous inks of different colors, five parallel lines having each a length of about 15 cm were manually drawn on the film. Then the time (seconds) which lapsed until the inks were wiperesistant was measured.

(D) Color change

Lines were drawn with an aqueous, brown ink which was known to tend to a color change towards green upon storage of the inked material at room temperature over a prolonged period. The color change was evaluated after 24 hours.

The results of the described tests were compiled in Table 1 below. The symbols used in the table have the following meanings:

| Evaluation | Water resistance, Adhesion of the Coating | Color change |
|---|---|---|
| + | good | no |
| +0 | substantially good | slight |
| 0+ | medium | pronounced |
| 0 | bad | complete |

TABLE 1

| Amount of polyvinyl alcohol (%) | Test No. A | B | C | D |
|---|---|---|---|---|
| 0 | + | + | 30 | 0 |
| 10 | + | + | 30 | 0 |
| 20 | + | +0 | 1-2 | 0 |
| 30 | + | +0 | 1 | 0 |
| 40 | +0 | +0 | 1 | 0 |
| 50 | 0+ | +0 | 1 | +0 |
| 60 | 0+ | +0 | 1 | +0 |
| 70 | 0+ | +0 | 1 | + |
| 80 | 0+ | 0+ | 1 | + |
| 90 | 0 | 0+ | 1 | + |
| 100 | 0 | 0+ | 1 | + |

EXAMPLE 2

The procedure employed was the same as in Example 1. Polyvinyl alcohol of Type I was combined in 3 different mixing ratios with each of the sulfonate group-containing copolyesters AQ 29(1), AQ 38(2) and AQ 55(3), all supplied by EASTMAN KODAK. Table 2 below also indicates the results achieved when the copolyesters were used alone.

TABLE 2

| Copolyester No. | Amount of Copolyester (%) | Test No. A | B | C | D |
|---|---|---|---|---|---|
| 1 | 30 | 0+ | +0 | 1 | + |
| | 50 | 0+ | +0 | 1 | +0 |
| | 70 | + | +0 | 1 | 0 |
| | 100 | + | + | 30 | 0 |
| 2 | 30 | +0 | +0 | 1 | + |
| | 50 | 0+ | +0 | 1 | +0 |
| | 70 | + | +0 | 30 | 0 |
| | 100 | + | + | 30 | 0 |
| 3 | 30 | +0 | +0 | 1 | + |
| | 50 | 0+ | +0 | 1 | +0 |
| | 70 | + | +0 | 5 | 0+ |
| | 100 | + | + | 30 | 0 |

EXAMPLE 3

By means of a doctor blade, the base material described in Example 1 was coated with solutions comprising the combinations specified in Table 3 below, such that hydrophilic coatings having thicknesses of about 2 to 3 μm were obtained after drying of the coated solutions at 120 ° C. for 3 minutes. In each case, the mixing ratio of copolyester (1) and one of the polyvinyl alcohols (Types I to VI) was 1:1.

TABLE 3

| Polyvinyl alcohol | Test No. A | B | C+ | D |
|---|---|---|---|---|
| I | + | +0 | +0 | + |
| II | + | +0 | + | + |
| III | + | +0 | 0+ | + |
| IV | + | 0+ | +0 | +0 |
| V | + | +0 | +0 | 0 |
| VI | + | 0+ | 0+ | 0+ |

+In this Example, drying of the ink was tested in a manner different from the test described above. Method C+ refers to a test performed using a black felt pen having a broad tip and being intended for hand-writing and not for use in a plotter (SCHWAN STABILO M black). The symbols employed to characterize the speed of ink drying have the following meanings:
+ very fast
+0 fast
0+ slow
0 very slow

EXAMPLE 4

To prevent a color change, varying amounts of the above-described ethylene oxide adduct N based on an amine were added to 100 g of a 10% strength solution comprising 70 parts of copolyester AQ 29 and 30 parts of polyvinyl alcohol, Type I.

The applied solutions were dried in a circulating air drying cabinet at 120° C. for 2 minutes, such that 2 to 3 μm thick coatings resulted. The polyester film described in Example 1 was used as the base material. The test results are shown in Table 4 below.

TABLE 4

| Added amount of N (g) | Test No. A | C | D |
|---|---|---|---|
| 0 | +0 | 2 | 0+ |
| 0.5 | + | 5 | +0 |
| 1.0 | + | 1-2 | + |

EXAMPLE 5

The base material of Example 1 was coated with solutions which were dried at 120° C. within 5 minutes. The resulting hydrophilic coatings had thicknesses of 1 to 2 μm and adhered excellently to the base material.

The following solution was used as the stock solution:

| | |
|---|---|
| 150 g | of copolyester AQ 29 (10% strength) |
| 150 g | of polyvinyl alcohol Type I (10% strength) |
| 18 g | of a 5% strength suspension in water of finely divided aluminum silicate, ground for 5 hours in a ball mill, and |
| 4.5 g | of neutralized palm nut fatty acid sarcoside (40% strength, as surfactant and antistatic agent). |

This solution was adjusted to a pH of 3.6 by means of 5% strength citric acid.

Varying amounts of crosslinking agent were added to batches of this solution weighing each 50 g. The crosslinking agents were hexamethoxymethylmelamine (5% strength, in a 1:1 mixture of mineral spirits and water), which is designated $V_I$ in Table 5 below and partially etherified melamine/formaldehyde resin (5% strength, in water), which is designated $V_{II}$ in Table 5 below.

Table 5 summarizes the combinations employed and the properties of the coatings obtained.

TABLE 5

| Crosslinking agent employed (%) | Test No. B | C+ | D | Surface resistance (Ohm) |
|---|---|---|---|---|
| none | +0 to 0+ | + | 0 | $2.6 \times 10^{11}$ |
| $V_I$ | | | | |
| 1 | + to +0 | +0 | + | $4.0 \times 10^{11}$ |
| 3 | + to +0 | +0 | + | $1.1 \times 10^{12}$ |
| 5 | + to +0 | +0 | + to +0 | $3.6 \times 10^{12}$ |
| $V_{II}$ | | | | |
| 1 | + | +0 | + | $4.6 \times 10^{11}$ |
| 3 | + | +0 to 0+ | + | $7.0 \times 10^{11}$ |
| 5 | + to +0 | +0 | + | $1.0 \times 10^{12}$ |

The surface resistance was measured to evaluate the antistatic behavior of the coating. It was measured after conditioning the samples for 24 hours at 23° C. and 50% relative humidity. Measurement was performed by means of a spring reed electrode (set-up A), in accordance with DIN 53,482 or VDE 0303, part 3, at a voltage of 100 V. The surface resistance of materials provided with an antistatic finish should be clearly less than $10^{13}$ ohm.

EXAMPLE 6

The solution of Example 5, which contained 5% of hexamethoxymethylmelamine, was additionally mixed with ethylene oxide adduct N, such that the content of the coating of this substance was 5%. This coating solution was applied to the below described polyester film base materials, which were equipped with differing adhesion-promoting layers, such that coatings having a thickness of about 2 μm were obtained after a drying period of 3 minutes at 120° C.

| Thickness of polyester film (μm) | Adhesion-promoting layer acc. to German Offenlegungs-/Patentschrift No. |
|---|---|
| 125 | 25 25 783 |
| 50 | 16 94 534 (PVAL-Type) |
| 75 | 16 94 534 (PVDC-Type) |
| 75 | 12 28 414 |
| 100 | 16 29 480 (PVDC-Type) |

The adhesion of the coating to the different base materials was tested in accordance with Example 1 and was found to be excellent in all cases.

EXAMPLE 7

The base material employed in Example 1 was coated with various solutions, which were dried for 3 minutes at 120° C. The resulting dry coatings had thicknesses of about 2 to 3 μm and adhered excellently to the base material.

The stock solution employed had the following composition:

| |
|---|
| 270 g of copolyester AQ 29 (10% strength), |
| 270 g of polyvinyl alcohol, Type I (10% strength), |
| 2.7 g of ethylene oxide adduct N, and |
| 4 ml of p-toluenesulfonic acid. |

The solution had a pH of 3.9, measured with a glass electrode.

In addition to the two products listed in Example 5, the melamine/formaldehyde resin MF (5% strength, in water), hereinafter designated $V_{III}$, was employed as crosslinking agent. The crosslinking agents were mixed with 50 g batches of the stock solution. The individual combinations and the properties of the resulting layers are summarized in Table 6 below.

TABLE 6

| Crosslinking agent employed (%) | Test No. B | C+ | D |
|---|---|---|---|
| none | 0+ | +0 | + |
| $V_I$ | | | |
| 1 | + to +0 | + | + |
| 3 | + | + to +0 | + |
| 5 | + | +0 | + |
| $V_{II}$ | | | |
| 1 | + | + | + |
| 3 | + | + | + |
| 5 | + | + | + |
| $V_{III}$ | | | |
| 1 | + | + to +0 | + |
| 3 | + | + to +0 | + |
| 5 | + | +0 | + |

EXAMPLE 8

The polyester film of Example 1, which had been provided with an adhesion-promoting layer was used as the base material. The film was machine-coated with the following solution which was dried at 120° C. within 1 minute, such that a dry coating having a thickness of 2 to 3 μm was obtained:

| |
|---|
| 1,000 g of polyvinyl alcohol, Type I (5% strength), |
| 1,000 g of copolyester dispersion AQ 29 (5% strength), |
| 5 g of polyethylene oxide adduct N, |
| 60 g of aluminum silicate dispersion in water (5% strength), |
| 20 g of citric acid (10% strength), and |
| 20 g of hexamethoxymethylmelamine, $V_I$ (5% strength in a 1:1 mixture of mineral spirits and water). |

The prepared solution had a pH of 3.3. The properties of the film provided with the coating according to this invention were compared to the properties of two other polyester film bases which had been provided with coatings of polyvinyl alcohol and polyvinyl pyrrolidone, respectively.

The materials were subjected to the tests described in the preceding Examples and were additionally marked in a pen plotter using the following inks:

| | |
|---|---|
| Aqueous inks: | 32 HP 03 KS, available from STAEDTLER colors: black, red, blue, green, brown |
| | W 1676 CAD PEN, available from FABER CASTELL colors: black, red, blue, green, brown |
| Solvent-containing inks: | 31 HP 03 KS, available from STAEDTLER colors: black, red, orange, violet |

-continued

| |
|---|
| blue, yellow |

The marked films were projected using an appropriate device and the quality of the projected images was assessed.

Furthermore, the films were marked manually with the aqueous drawing inks F and FL supplied by ROTRING, and the adhesion of the inks was tested with an adhesive tape. The ink lines were also evaluated in respect of ink acceptance by the material and line sharpness. The symbols used in the Table have the following meanings:

| | |
|---|---|
| + | good |
| +0 | substantially good |
| 0+ | medium |
| 0 | bad |

The test results are shown in Table 7 below.

TABLE 7

| Property tested | | Film acc. to Example 8 | Film coated with polyvinyl alcohol | Film coated with polyvinyl pyrrolidone |
|---|---|---|---|---|
| Thickness of coating (μm) | | 2-3 | ca. 2 | 1-2 |
| Adhesion of coating | | +0 | +0 | 0 |
| Water resistance | | +0 | 0 | 0+ |
| Finger prints | | can be wiped off | cannot be wiped off | cannot be wiped off |
| Surface resistance (ohm) | | $2 \cdot 10^{13}$ | $8.0 \cdot 10^{13}$ | $1.2 \cdot 10^{13}$ |
| Drying time of ink (seconds) | | 6 | 4 | 5 |
| Markability with pen plotter inks | | | | |
| 32 HP | line sharpness | good | bad | good |
| aqueous | surface coverage | good | bad | good |
| W 1676 | line crispness | good | bad | good |
| aqueous | surface coverage | good | good | substantially good |
| 31 HP | line spreading | good* | good | good |
| solvent | overall impression | good | good | good |
| Markability with drawing inks F/FL | | | | |
| ink adhesion | | +0/+ | 0/0 | 0/0 |
| ink acceptance | | +0/+ | 0+/0+ | 0+/0+ |
| ink line crispness | | +/+ | 0+/0+ | 0+/0+ |

*good means, the line is in the tolerance of width

EXAMPLE 9

A polyester film as described in Example 1, which had been provided with an adhesion-promoting layer, was used as the base material. The following solutions were applied by means of a coating machine and dried at 120° C. for about 1 minute, so that a 3 μm thick coating was obtained:

| | |
|---|---|
| 1,000 | g of polyvinyl alcohol, Type I (5% strength), |
| 1,000 | g of copolyester dispersion AQ 29 (5% strength), |
| 5 | g of polyethylene oxide adduct N, |
| 60 | g of aluminum silicate dispersion in water (5% strength), |
| 20 | g of citric acid (10% strength), and |
| 40 | g of hexamethoxymethylmelamine (5% strength, in a 1:1 mixture of mineral spirits and water). |

The resulting solution had a pH of 3.3.

To prepare a one-component diazo copying material for semi-dry development, the hydrophilic coating on the crystal-clear polyester film was coated with the following solution by means of a metering bar, and the applied solution was dried in a drying cabinet at 100° C. within about 2 minutes:

| | |
|---|---|
| 90 | ml of water |
| 10 | ml of isopropanol |
| 1 | g of surfactant |
| 1 | g of citric acid |
| 6 | g of naphthalene-1,3,6-trisulfonic acid (sodium salt) and |
| 4 | g of 4-diazo-1-tolylmercapto-2,5-diethoxy-benzene-½-$ZnCl_2$. |

The diazo copying material produced in this way was imagewise exposed through an original and developed in a semi-dry developing device with a commercially available semi-dry developer.

A crystal-clear film exhibiting a pattern of neutral black lines on a colorless background was obtained.

EXAMPLE 10

A hydrophilic coating was prepared as described in Example 9, with the exception that the coating solution comprised 7.5 g of 10% strength p-toluenesulfonic acid instead of 20 g of 10% strength citric acid.

The coating had a pH of 4.1.

To produce a two-component diazo copying material for dry development, the hydrophilic coating was coated with the following solution which was subsequently dried:

| | |
|---|---|
| 10.0 | ml of water |
| 5.0 | ml of isopropanol |
| 4.0 | g of citric acid |
| 4.0 | g of thio-urea |
| 0.5 | g of saponin |
| 4.0 | g of zinc chloride |
| 2.5 | g of dioxynaphthalene-6-sulfoacid (sodium salt) and |
| 1.0 | g of 4-diazo-dimethylaniline-$ZnCl_2$. |

The diazo copying material thus obtained was imagewise exposed through an original in a commercially available diazo copying apparatus and developed with ammonia vapor.

A crystal-clear film exhibiting a pattern of blue lines on a colorless background was obtained.

What is claimed is:

1. A drafting material, comprising:

a transparent base material having on at least one surface a hydrophilic coating containing from about 30 to 70 percent by weight of polyvinyl alcohol and from about 70 to 30 percent by weight of a sulfonate-group-containing copolyester; and an adhesion-promoting layer between the transparent base material and the hydrophilic coating.

2. A material as claimed in claim 1, wherein the weight ratio of polyvinyl alcohol to copolyester in the hydrophilic coating is about 1:1.

3. A material as claimed in claim 1, wherein the hydrophilic coating has a thickness of about 0.5 to 10 μm.

4. A material as claimed in claim 3, wherein the hydrophilic coating has a thickness of about 2 to 4 μm.

5. A material as claimed in claim 1, wherein the base material comprises a polyester film.

6. A material as claimed in claim 5, wherein the base material is a biaxially stretched and heat-set polyethylene terephthalate film.

7. A material as claimed in claim 1, further comprising a crosslinking agent in the hydrophilic coating.

8. A material as claimed in claim 7, wherein the crosslinking agent contained in the hydrophilic coating comprises a formaldehyde compound derived from urea or melamine.

9. A material as claimed in claim 8, wherein the hydrophilic coating comprises about 0.5 to 3 percent by weight, relative to the dry weight of the coating, of crosslinking agent.

10. A material as claimed in claim 1, further comprising a photosensitive diazonium compound in the hydrophilic coating, in combination with a stabilizer.

11. A material as claimed in claim 10, further comprising a coupling component in said hydrophilic coating.

* * * * *